(12) United States Patent
Torosyan (10) Patent No.: US 7,539,716 B2
(45) Date of Patent: May 26, 2009

(54) METHOD AND APPARATUS FOR IMPROVED DIRECT DIGITAL FREQUENCY SYNTHESIZER

(75) Inventor: Arthur Torosyan, La Crescenta, CA (US)

(73) Assignee: Pentomics, Inc., Pasadena, CA (US)

( * ) Notice: Subject to any disclaimer, the term of this patent is extended or adjusted under 35 U.S.C. 154(b) by 759 days.

(21) Appl. No.: 11/043,518

(22) Filed: Jan. 26, 2005

(65) Prior Publication Data
US 2006/0167962 A1 Jul. 27, 2006

(51) Int. Cl.
G06F 1/02 (2006.01)
(52) U.S. Cl. ...................................... 708/271
(58) Field of Classification Search .......... 708/270–277
See application file for complete search history.

(56) References Cited

U.S. PATENT DOCUMENTS

| | | | | |
|---|---|---|---|---|
| 4,159,526 A | * | 6/1979 | Mosley et al. ............... | 708/276 |
| 4,893,316 A | * | 1/1990 | Janc et al. .................. | 708/300 |
| 5,737,253 A | * | 4/1998 | Madisetti et al. ............ | 708/276 |
| 6,005,419 A | * | 12/1999 | Rudish ...................... | 708/271 |
| 6,308,190 B1 | | 10/2001 | Willson, Jr. et al. | |
| 6,522,176 B1 | * | 2/2003 | Davis ........................ | 327/105 |
| 6,867,625 B1 | * | 3/2005 | Stoyanov .................... | 327/105 |
| 6,874,006 B1 | * | 3/2005 | Fu et al. ..................... | 708/442 |
| 7,180,384 B2 | * | 2/2007 | Efstathiou et al. .......... | 332/106 |
| 7,203,718 B1 | * | 4/2007 | Fu et al. ..................... | 708/622 |
| 7,284,025 B2 | * | 10/2007 | Sullivan et al. ............. | 708/271 |
| 7,327,783 B2 | * | 2/2008 | Sullivan .................... | 708/622 |
| 2005/0091295 A1 | * | 4/2005 | Harron et al. ............... | 708/271 |

* cited by examiner

*Primary Examiner*—Chat C Do
(74) *Attorney, Agent, or Firm*—Denis Khoo (57) ABSTRACT

An improved DDFS includes a minority-bit detector to permit a series of cascaded transformation stages to perform half or less than half of the rotational operations otherwise required by detecting whether the required rotation or non-rotation operations are in the minority and performing only the operations in the minority. This substantially reduces the number of minority-select butterfly stages that would otherwise be required. The cascaded transformation stages include a preliminary set of lookup tables in ROM memory, one of which is selected in accordance with the minority-bit detector and may include a subsequent set of butterfly stages providing the inputs to the minority-select butterfly stages.

20 Claims, 3 Drawing Sheets

METHOD AND APPARATUS FOR IMPROVED DIRECT DIGITAL FREQUENCY SYNTHESIZER

BACKGROUND OF THE INVENTION

1. Field of the Invention

The present invention relates to digital signal generators and more particularly to improved Direct Digital Frequency Synthesizers (DDFS).

2. Background of the Prior Art

For many digital circuits, it is often necessary to generate a sequence of sample values of a sine or cosine function at a particular frequency that may be adjusted while the time interval between samples remains fixed. Circuits known as Direct Digital Frequency Synthesizers (DDFS) perform this function. Many conventional art DDFS's generate the sine and cosine values by performing a table-lookup in a read only memory (ROM) that contains the values of samples of a sine/cosine function at the required angle values, and then provide these values as the output. The sequence of desired angles is generated by a phase accumulator. More precisely, the phase accumulator produces a sequence of normalized angles that are used to address the ROM. The table-lookups are performed at a very precisely controlled rate, which is the sample rate, and the desired frequency of the generated sinusoid is determined by the rate, relative to this reference rate, at which angles generated by the phase accumulator cycle through a range of values corresponding to [0, 2π).

Although these prior art table-lookup DDFS's perform adequately for many purposes, the tables often are large and occupy a relatively large amount of chip area when implemented as integrated circuits. Various techniques have been developed to reduce the ROM table size, which is determined by the number of address bits (i.e., the most significant portion of the phase accumulator output) and the precision of (i.e., the number of bits representing) the sine/cosine outputs. Truncation of the phase accumulator output is usually employed in order to reduce the lookup table size, as this size will double with each additional bit in the table address word. This phase truncation, however, creates imperfections in the output sine/cosine function since a sine/cosine value corresponding to a truncated phase will correspond to an effective value that is different from the sine/cosine value at the exact angle. Furthermore, the truncated phase accumulator values can be viewed as values obtained by adding some sequence of error terms to the sequence of exact angle values. Furthermore, the finite precision of the sine/cosine outputs contributes additional error terms. Thus, the output of the table-lookup process will consist of the superposition of the sine/cosine signal at the desired frequency and various other frequencies that result from the processing of the truncated phase sequence by the table-lookup and the finite precision sine/cosine outputs. These undesired frequency components are referred to as "spurious frequencies," or "spurs." The amplitude of these spurs should be small, and the quality of the DDFS is often assessed by determining how small the amplitudes of the spurs are. The "spurious free dynamic range" is the difference between the amplitude of the desired sinusoid and that of the largest spur. It is usually measured in decibels (dB).

One prior art technique for generating trigonometric functions such as sine and cosine, developed in the 1950's and known as CORDIC, avoids ROM table-lookups. CORDIC calculates the sine and cosine values of a particular angle through a series of rotations of a point in the complex plane, initially coincident with the X-axis on the unit circle. The X-axis and the Y-axis coordinates, representing the real and imaginary parts of a complex-valued number, at the final angle are the desired cosine and sine values, respectively.

However, according to the conventional CORDIC methodology, at each rotation it must be determined whether to rotate clockwise or counter-clockwise, where a counter-clockwise rotation corresponds to $\alpha_i=1$ and a clockwise rotation corresponds to $\alpha_i=-1$. CORDIC tries to approximate an angle θ as a sum of subangles $\Sigma\theta_i$. At each stage, if the approximation generated by all previous stages is larger than the desired angle θ, then the current stage decreases the value of the approximation by $\theta_i$; otherwise the approximation is increased by $\theta_i$. Thus, at each stage the direction of the rotation is chosen such that the error between the desired angle θ and the approximation is reduced. In CORDIC, the $\alpha_i$ coefficients (which determine the direction of the rotation) are determined iteratively for each rotation stage and each one requires a comparator or its equivalent.

An improved DDFS is shown in U.S. Pat. No. 5,737,253, assigned to the assignee of the present invention, which is incorporated herein in its entirety. This improved DDFS provides a high-speed DDFS integrated circuit with high precision sine and cosine output data and a chip area smaller than could then be obtained using table-lookup-based or CORDIC approaches to the DDFS. A phase accumulator provides a sequence of angles to a sine/cosine generator that outputs a sequence of values of the sine/cosine function at a desired frequency. The sine/cosine generator includes a plurality of multiplierless butterfly and carry-save adder stages in cascade that perform angle rotations to calculate the sine and cosine values for each desired angle. The angle rotations are chosen to implement a series of transformations that result in closer and closer approximations to the sine and cosine values of the desired angle.

Multipliers may be eliminated from butterfly stages by taking advantage of the approximation $\tan \theta_k \approx \theta_k$. For sufficiently small $\theta_k$ (i.e., for sufficiently large k) the approximation $$\tan \theta_k \approx \theta_k = 2^{-k} \qquad (1)$$

reduces the corresponding multiplications performed by the butterfly stages to simple shift operations by a fixed number of bits (k bits). This approximation causes no loss of accuracy in the $\tan \theta_k$ representation so long as $\tan \theta_k$ is sufficiently small that the difference $(\theta_k-\tan \theta_k)$ is smaller than the finite-precision limits of the output data.

A multiplexer provides sine and cosine values for an angle that is the algebraic sum of the first M subangles $\theta_k$ that are not sufficiently small to employ the approximation $\tan \theta_k \approx \theta_k$. The subangles become successively smaller for each successive stage and the remaining subangles after these first M subangles satisfy the approximation $\tan \theta_k \approx \theta_k$ to a desired accuracy. The sine and cosine values provided by the multiplexer are then input to the subsequent rotation stages, which perform the subsequent rotations to calculate the sine and cosine values for the desired angle. Rather than using a multiplexer, a small ROM table can also be used to perform the same function.

Only angles within a quadrant or within an octant, e.g. [0, π/4], need be provided to the rotation stages and the sine and cosine values for any angle in [0, 2π) can be computed from these angles by well-known trigonometric identities. Techniques are disclosed in U.S. Pat. No. 5,737,253 for converting an angle in [0, 2π) to a related angle in [0, π/4], performing the previously described rotations to calculate sine and cosine values for the transformed angle, and then deriving the sine and cosine values for the original angle in $[0, 2\pi)$ from the sine and cosine values for the transformed angle in $[0, \pi/4]$.

To summarize, an angle $\theta = b_1\theta_1 + b_2\theta_2 + \ldots + b_N\theta_N$ is generated where $b_k \in \{0,1\}$ are binary bits and the $\theta_k = 2^{-k}$ are the associated positional weights. Next, the sine and cosine values for a subangle $\omega$, the algebraic sum of the first M rotation angles of $\theta$, are obtained through a multiplexer or similar device (e.g., ROM table). Subangle $\omega$ may be chosen such that the remaining subangles that are processed may utilize the approximation $\tan \theta_k \approx \theta_k$ and the binary $b_k \in \{0,1\}$ are recoded into signed digits $r_k \in \{-1,+1\}$ for an arbitrary angle $\theta$ by the mapping $r_k = 2b_{k-1} - 1$. The following transformation formulae are then used:

$$X_k = X_{k-1} - r_k 2^{-k} Y_{k-1} \text{ and } Y_k = Y_{k-1} + r_k 2^{-k} X_{k-1} \quad (2)$$

where $X_{k-1}$ is the cosine value and $Y_{k-1}$ is the sine value. The determined $X_k$ cosine value and $Y_k$ sine value are then successively provided as the $X_{k-1}$ and $Y_{k-1}$ inputs to subsequent transformation formulae until the desired accuracy is reached.

The number of rotation stages required by both the CORDIC and the Modified CORDIC algorithms are comparable to one another. In every butterfly stage, the CORDIC and the Modified CORDIC angle decompositions, equations (3) and (4), respectively, both require a nonzero rotation either in the positive or negative direction, $$\omega = \sum_{i=1}^{N} \sigma_i \omega_i, \quad (3)$$

where $\sigma_i \in \{-1,+1\}$, $\omega_i = \arctan 2^{-i}$ for CORDIC and $\omega_i = 2^{-i}$ for Modified CORDIC, $$\omega = \phi + \sum_{i=2}^{N+1} r_i \omega_i, \text{ with } r_i \in \{-1, +1\} \text{ and} \quad (4)$$

$$\phi = \sum_{i=2}^{N+1} \omega_i = \frac{1}{2} - \frac{1}{2^{N+1}}.$$

For the CORDIC and the Modified CORDIC algorithms these nonzero rotations are necessary (i.e., $\sigma_i \neq 0$) to facilitate the creation of the "rotation-angle-independent-constant"

$$K = \prod_{i=1}^{N} \cos \omega_i$$

in equations (6) and (7) from the $\cos \sigma_i \omega_i$ terms factored out of the butterfly stages in equation (5). Equation (7) reflects the CORDIC angle decomposition $\omega_i = \arctan 2^{-i}$.

$$\begin{bmatrix} \cos\omega \\ \sin\omega \end{bmatrix} = \begin{bmatrix} \cos\sigma_N\omega_N & -\sin\sigma_N\omega_N \\ \sin\sigma_N\omega_N & \cos\sigma_N\omega_N \end{bmatrix} \quad (5)$$

$$\cdots \begin{bmatrix} \cos\sigma_i\omega_i & -\sin\sigma_i\omega_i \\ \sin\sigma_i\omega_i & \cos\sigma_i\omega_i \end{bmatrix} \cdots \begin{bmatrix} \cos\sigma_1\omega_1 & -\sin\sigma_1\omega_1 \\ \sin\sigma_1\omega_1 & \cos\sigma_1\omega_1 \end{bmatrix} \begin{bmatrix} 1 \\ 0 \end{bmatrix}$$

$$\begin{bmatrix} \cos\omega \\ \sin\omega \end{bmatrix} = \begin{bmatrix} 1 & -\sigma_N\tan\omega_N \\ \sigma_N\tan\omega_N & 1 \end{bmatrix} \quad (6)$$

$$\cdots \begin{bmatrix} 1 & -\sigma_i\tan\omega_i \\ \sigma_i\tan\omega_i & 1 \end{bmatrix} \cdots \begin{bmatrix} 1 & -\sigma_1\tan\omega_1 \\ \sigma_1\tan\omega_1 & 1 \end{bmatrix} \begin{bmatrix} K \\ 0 \end{bmatrix}$$

$$\begin{bmatrix} \cos\omega \\ \sin\omega \end{bmatrix} = \begin{bmatrix} 1 & -\sigma_N 2^{-N} \\ \sigma_N 2^{-N} & 1 \end{bmatrix} \quad (7)$$

$$\cdots \begin{bmatrix} 1 & -\sigma_N 2^{-i} \\ \sigma_N 2^{-i} & 1 \end{bmatrix} \cdots \begin{bmatrix} 1 & -\sigma_N 2^{-1} \\ \sigma_N 2^{-1} & 1 \end{bmatrix} \begin{bmatrix} K \\ 0 \end{bmatrix}.$$

If one permits $\sigma_i$ to also take on the value of zero, then the necessary condition $\cos \sigma_i \omega_i = \cos \omega_i$ for constant K will not hold when a $\sigma_i = 0$. Similarly, for the Modified CORDIC algorithm, the nonzero rotations are necessary (i.e., $r_i \neq 0$) to produce the "rotation-angle-independent-constant"

$$K = \prod_{i=2}^{N+1} \cos \omega_i$$

in equations (9), (10), and (11), by the factored out $\cos r_i \omega_i$ terms from the butterfly stages in equation (8) and carrying out the multiplication $$\begin{bmatrix} \cos\phi & -\sin\phi \\ \sin\phi & \cos\phi \end{bmatrix} \begin{bmatrix} 1 \\ 0 \end{bmatrix} = \begin{bmatrix} \cos\phi \\ \sin\phi \end{bmatrix}.$$

If any $r_i$ is allowed to take on the value of zero, then the necessary condition $\cos r_i \omega_i = \cos \omega_i$ for the constant K will not hold. From these observations one may deduce that reducing the total number of rotations may be infeasible since "no rotation" corresponds to $\sigma_i = 0$ or $r_i = 0$.

$$\begin{bmatrix} \cos\omega \\ \sin\omega \end{bmatrix} = \begin{bmatrix} \cos r_{N+1}\omega_{N+1} & -\sin r_{N+1}\omega_{N+1} \\ \sin r_{N+1}\omega_{N+1} & \cos r_{N+1}\omega_{N+1} \end{bmatrix} \quad (8)$$

$$\cdots \begin{bmatrix} \cos\sigma_2\omega_2 & -\sin r_2\omega_2 \\ \sin\sigma_2\omega_2 & \cos r_2\omega_2 \end{bmatrix} \begin{bmatrix} \cos\phi & -\sin\phi \\ \sin\phi & \cos\phi \end{bmatrix} \begin{bmatrix} 1 \\ 0 \end{bmatrix}$$

$$\begin{bmatrix} \cos\omega \\ \sin\omega \end{bmatrix} = \begin{bmatrix} 1 & -r_{N+1}\tan\omega_{N+1} \\ r_{N+1}\tan\omega_{N+1} & 1 \end{bmatrix} \quad (9)$$

$$\cdots \begin{bmatrix} 1 & -r_i\tan\omega_i \\ r_i\tan\omega_i & 1 \end{bmatrix} \cdots \begin{bmatrix} 1 & -r_2\tan\omega_2 \\ r_2\tan\omega_2 & 1 \end{bmatrix} \begin{bmatrix} K\cos\phi \\ K\sin\phi \end{bmatrix}$$

$$\begin{bmatrix} \cos\omega \\ \sin\omega \end{bmatrix} = \begin{bmatrix} 1 & -r_{N+1}\tan 2^{-(N+1)} \\ r_{N+1}\tan 2^{-(N+1)} & 1 \end{bmatrix} \quad (10)$$

$$\cdots \begin{bmatrix} 1 & -r_i\tan 2^{-i} \\ r_i\tan 2^{-i} & 1 \end{bmatrix} \cdots \begin{bmatrix} 1 & -r_i\tan 2^{-2} \\ r_i\tan 2^{-2} & 1 \end{bmatrix} \begin{bmatrix} K\cos\phi \\ K\sin\phi \end{bmatrix}$$

-continued $$\begin{bmatrix} \cos\omega \\ \sin\omega \end{bmatrix} = \begin{bmatrix} 1 & -r_{N+1}2^{-(N+1)} \\ r_{N+1}2^{-(N+1)} & 1 \end{bmatrix} \quad (11)$$

$$\cdots \begin{bmatrix} 1 & -r_{\beta+1}2^{-(\beta+1)} \\ r_{\beta+1}2^{-(\beta+1)} & 1 \end{bmatrix} \times \begin{bmatrix} 1 & -r_\beta\tan2^{-\beta} \\ r_\beta\tan2^{-\beta} & 1 \end{bmatrix}$$

$$\cdots \begin{bmatrix} 1 & -r_2\tan2^{-2} \\ r_2\tan2^{-2} & 1 \end{bmatrix} \begin{bmatrix} K\cos\phi \\ K\sin\phi \end{bmatrix}$$

What is needed is a DDFS design which improves on the conventional DDFS designs by, for example, reducing the number of stages requiring rotation.

SUMMARY OF THE DISCLOSURE

In accordance with a first aspect, a direct digital frequency synthesizer circuit is disclosed including a phase accumulator responsive to a frequency control word input to produce a sequence of truncated, normalized rotation angles and a mapping function circuit responsive to the phase accumulator circuit for producing one or more digital output signals including a sequence of values representing sine and/or cosine functions of the sequence of rotation angles related to the frequency control word input. The mapping function circuit includes a phase mapper and phase multiplier circuit responsive to the sequence of normalized rotation angles for producing a series of subangles, a minority-bit detector circuit responsive to the series of subangles to determine whether positive or no rotation operations, or alternately positive or negative or negative or no rotation operations, are in the minority in a subset of the series of subangles and a series of circuit stages in cascade for performing transformation operations responsive to the series of subangles to produce angle rotations corresponding to the series of subangles, the series of circuit stages including at least one minority-select rotation circuit stage for performing positive, negative or no rotation for a subset of transformation operations in response to the minority-bit detector circuit.

In accordance with another aspect, a method is disclosed for performing direct digital frequency synthesis by producing a sequence of truncated, normalized rotation angles in accordance with a frequency control word, producing a series of subangles from the sequence of truncated, normalized rotation angles, determining with respect to a subset of the series of subangles if positive or no rotation operations are in a minority in the subset and performing a series of transformation operations responsive to the series of subangles to produce one or more digital output signals including a sequence of values representing sine and/or cosine functions of the sequence of rotation angles related to the frequency control word input, the subset of transformations corresponding to the subset of the series of subangles being performed as positive, negative or no rotation operations in accordance with the type of rotation operations determined to be in the minority in order to reduce the total number of transformation operations required.

BRIEF DESCRIPTION OF THE DRAWINGS

The objects, features and advantages of the present invention will be apparent from the following detailed description of the preferred embodiment(s) of the invention with references to the drawings in which.

DETAILED DESCRIPTION OF THE INVENTION

Figure 1:
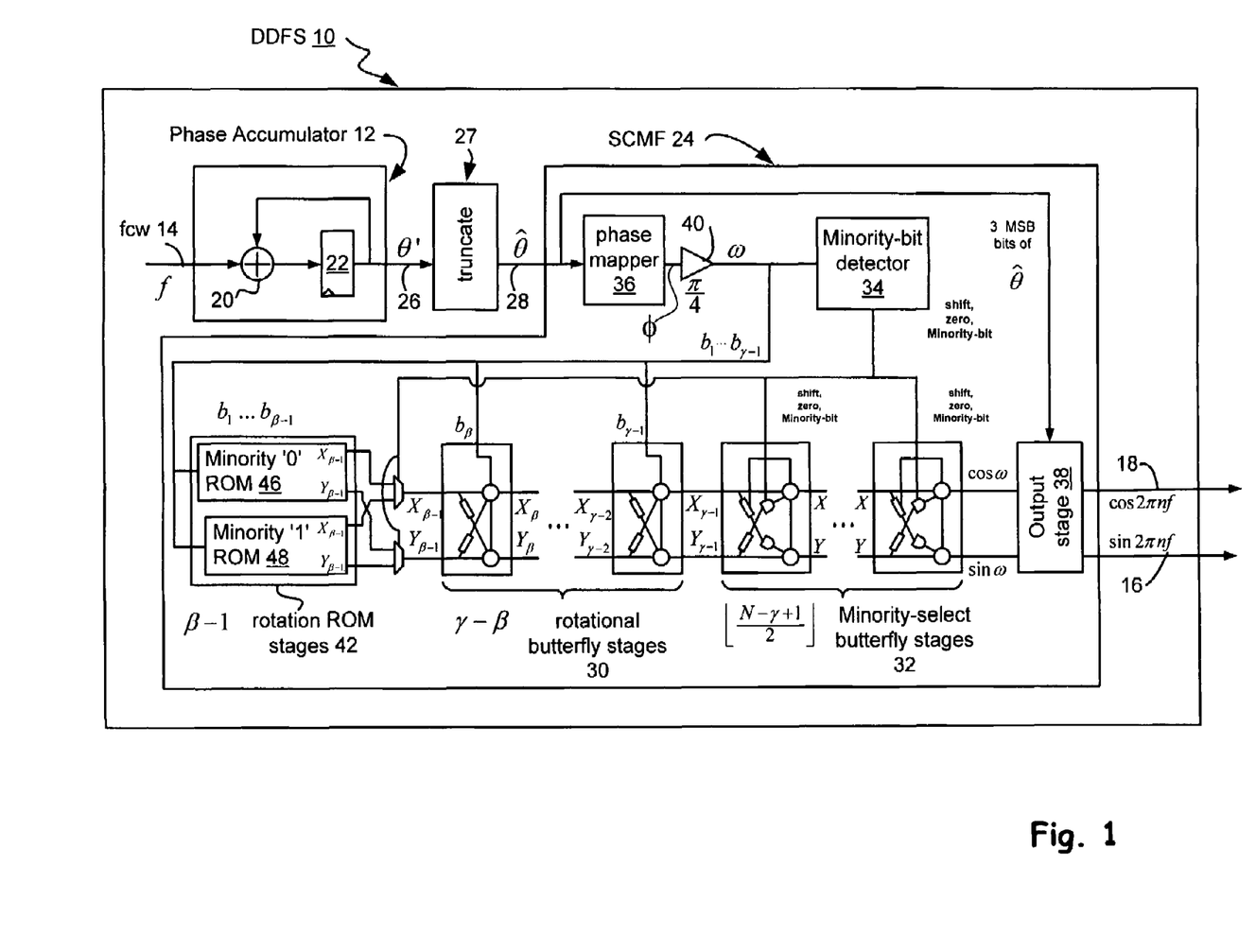
FIG. 1 is a block diagram illustration of a DDFS utilizing a minority-select algorithm.

Referring now to FIG. 1, an improved DDFS 10 is disclosed which takes advantage of a key property to allow "no rotation" stages and, via minority-bit detection, can completely eliminate a significant number of butterfly stages.

DDFS 10 includes phase accumulator 12 which receives a normalized input frequency control word, fcw 14, and generates a sequence of samples of sine and/or cosine functions 16 and 18 having the precise frequency dictated by the input fcw 14. Phase accumulator 12 includes overflowing adder 20 and feedback register 22. In operation, phase accumulator 12 serves to accumulate fcw 14 to produce a normalized phase angle applied to sine/cosine mapping function SCMF 24 to produce sine/cosine outputs 16 and/or 18, respectively.

A normalized rotation angle $\theta'$, accumulator output angle 26, is generated at the output of the phase accumulator 12 and is truncated in truncate operation 27 to provide an input angle $\hat{\theta}$, input angle 28, which is applied to SCMF 24. The phase accumulator 12 may be an M-bit adder, repeatedly incrementing $\theta'$, output angle 26, according to the input fcw 14. The SCMF input $\hat{\theta}$, input angle 28, is obtained from $\theta'$ by retaining the W most-significant bits of $\theta'$. If the input fcw 14 and the output angle 26 are considered as binary purely fractional positive numbers, the normalized output angle 26 is determined by the equation:

$$\hat{\theta} = \frac{\lfloor 2^W \theta' \rfloor}{2^W}. \quad (12)$$

The SCMF 24 takes the truncated normalized phase angle $\hat{\theta}$, as an input and generates the corresponding $\cos 2\pi\hat{\theta}$ and $\sin 2\pi\hat{\theta}$ at its outputs 16 and 18 which serve as approximations for their corresponding ideal values $\cos \theta$ (or $\cos 2\pi\theta'$) and $\sin \theta$ (or $\sin 2\pi\theta'$), respectively. The truncation of output angle 26, $\theta'$, to produce the SCMF input angle 28, $\hat{\theta}$, commonly referred to as phase truncation, causes errors (deterministic, periodic errors, often referred to as noise) at the output of conventional DDFS devices and also manifests itself as a set of spurious frequencies or spurs (signal components at undesired frequencies) at the outputs of conventional DDFS devices.

In a DDFS configured in accordance with the conventional modified CORDIC approach, as shown for example in U.S. Pat. No. 5,737,253 discussed above, regardless of the overall rotation angle amount $\omega$, the rotation stages always perform rotations (either positive or negative). In DDFS 10, however, the final stages may perform a positive or negative rotation, as shown in rotational butterfly stages 30, or no rotation as shown in minority-select butterfly stages 32, in which the butterfly stage conditionally collapses to a trivial pass-through function as discussed below and with regard to FIG. 2.

In SCMF 24, SCMF input angle 28 is applied as an input to phase mapper 36 and output swap and/or negate stage 38. Phase mapper 36 and phase multiplier stage 40 produce the overall (un-normalized) rotation angle $\omega$ which is applied to minority-bit detector 34, minority-select butterfly stages 32, rotational butterfly stages 30 (if needed) as well as ROM stages 42. In operation, phase mapper 36 and phase multiplier stage 40 can be used to provide sine and cosine values of any angle in the range in $[0, 2\pi)$ from the sine and cosine values of a related angle in the range $[0, \pi/4]$ by the use of the interchange and negate operations performed in output stage 38. For example, if $\theta = 4\pi/3$, then $$\sin\theta = -\frac{\sqrt{3}}{2} \text{ and } \cos\theta = -\frac{1}{2}.$$

The same results can be computed from the angle $$\phi = \frac{\pi}{6}$$

through interchange and negate operations since $$\sin\frac{4\pi}{3} = -\cos\frac{\pi}{6}$$

and $$\cos\frac{4\pi}{3} = -\sin\frac{\pi}{6}.$$

The phase mapper 36 performs the mapping of the SCMF input angle 28, $\hat{\theta}$, into the first-octant normalized angle $\phi$ representing the range $[0, \pi/4]$. The normalized angle $\hat{\theta}$ is remapped into a normalized angle $\phi$ by performing a conditional subtract operation as follows: First, the top two bits of $\hat{\theta}$ are stripped off (which removes the quadrant information) to create the temporary angle $\tau$. Next, if the angle $\hat{\theta}$ is in an odd octant (its third MSB bit is '1') then $\tau$ is subtracted from 0100 . . . 00 (the normalized value representing $\pi/2$) to produce the desired remapped angle $\phi$. If the angle $\hat{\theta}$ is in an even octant (its third MSB bit is '0') then $\tau$ simply becomes $\phi$. In this embodiment the SCMF input angle 28 is mapped into an octant, but it may similarly be mapped into any other desired fixed angular range, such as a quadrant. Alternately, other mappings of $[0, 2\pi)$ into $[0, \pi/4]$, along with other corresponding output-stage conditioned interchange and/or conditional negation operations can be employed to provide equivalent functionality, as would be evident to one skilled in the art.

Minority-bit detector 34 makes the elimination of at least half the total number of final rotation stages always possible by the following observation. The overall rotation angle $\omega$ may be represented as the two summations $$\omega = \sum_{i=1}^{\gamma-1} b_i \omega_i + \sum_{i=\gamma}^{N} b_i \omega_i \quad (13)$$

and, by applying the Modified CORDIC angle recoding $r_k = 2b_{k-1} - 1$ only to the first of these summations, one obtains $$\omega = \phi_1 + \sum_{i=2}^{\gamma} r_i \omega_i + \sum_{i=\gamma}^{N} b_i \omega_i \quad (14)$$

with $\omega_i = 2^{-i}$, $r_i \in \{-1, +1\}$, and $b_i \in \{0, +1\}$. The $\phi_1$ and $r_i$ in equation (14) are $$r_i = \begin{cases} -1 & \text{if } b_{i-1} = 0 \\ +1 & \text{if } b_{i-1} = 1 \end{cases} \quad (15)$$

and $$\phi_1 = \sum_{i=2}^{\gamma} \omega_i = \frac{1}{2} - \frac{1}{2^\gamma}. \quad (16)$$

Applying the angle decomposition in equation (14) to the butterfly stages 30 and 32 with the initial vector $X_0 = 1$ and $Y_0 = 0$ one obtains $$\begin{bmatrix} \cos\omega \\ \sin\omega \end{bmatrix} = \begin{bmatrix} \cos b_N \omega_N & -\sin b_N \omega_N \\ \sin b_N \omega_N & \cos b_N \omega_N \end{bmatrix} \quad (17)$$

$$\cdots \begin{bmatrix} \cos b_\gamma \omega_\gamma & -\sin b_\gamma \omega_\gamma \\ \sin b_\gamma \omega_\gamma & \cos b_\gamma \omega_\gamma \end{bmatrix} \times \begin{bmatrix} \cos r_\gamma \omega_\gamma & -\sin r_\gamma \omega_\gamma \\ \sin r_\gamma \omega_\gamma & \cos r_\gamma \omega_\gamma \end{bmatrix}$$

$$\cdots \begin{bmatrix} \cos r_2 \omega_2 & -\sin r_2 \omega_2 \\ \sin r_2 \omega_2 & \cos r_2 \omega_2 \end{bmatrix} \begin{bmatrix} \cos\phi_1 & -\sin\phi_1 \\ \sin\phi_1 & \cos\phi_1 \end{bmatrix} \begin{bmatrix} 1 \\ 0 \end{bmatrix}.$$

Factoring $\cos r_i \omega_i$ and $\cos b_i \omega_i$ out of all butterfly stages, applying $\tan r_i \omega_i = r_i \tan \omega_i$, and combining $$\begin{bmatrix} \cos\phi_1 & -\sin\phi_1 \\ \sin\phi_1 & \cos\phi_1 \end{bmatrix} \begin{bmatrix} 1 \\ 0 \end{bmatrix} = \begin{bmatrix} \cos\phi_1 \\ \sin\phi_1 \end{bmatrix},$$

equation (17) can be rewritten as $$\begin{bmatrix} \cos\omega \\ \sin\omega \end{bmatrix} = \begin{bmatrix} 1 & -b_N \tan\omega_N \\ b_N \tan\omega_N & 1 \end{bmatrix} \quad (18)$$

$$\cdots \begin{bmatrix} 1 & -b_\gamma \tan\omega_\gamma \\ b_\gamma \tan\omega_\gamma & 1 \end{bmatrix} \times \begin{bmatrix} 1 & -r_\gamma \tan\omega_\gamma \\ r_\gamma \tan\omega_\gamma & 1 \end{bmatrix}$$

$$\cdots \begin{bmatrix} 1 & -r_2 \tan\omega_2 \\ r_2 \tan\omega_2 & 1 \end{bmatrix} \begin{bmatrix} K_c \\ K_s \end{bmatrix}$$

where $$K_c = \cos\phi_1 \prod_{i=\gamma}^{N} \cos b_i \omega_i \prod_{i=2}^{\gamma} \cos\omega_i$$

$$K_s = \sin\phi_1 \prod_{i=\gamma}^{N} \cos b_i \omega_i \prod_{i=2}^{\gamma} \cos\omega_i$$

We also observe that, for the product of all cosine terms $$\prod_{i=\gamma}^{N} \cos b_i \omega_i \prod_{i=2}^{\gamma} \cos r_i \omega_i$$

since $r_i \in \{-1,+1\}$ then $\cos r_i \omega_i = \cos \omega_i$, but since $b_i \in \{0,+1\}$ $\cos b_i \omega_i \neq \cos \omega_i$, and $$\prod_{i=\gamma}^{N} \cos b_i \omega_i \prod_{i=2}^{\gamma} \cos \omega_i$$

is no longer a constant, but rather depends on the set $\{b_N, \ldots, b_\gamma\}$. Nevertheless, with the appropriate choice of $\gamma$ from inequality (20), where B indicates the desired accuracy of the approximation in equation (19) in terms of the number of fractional bits, applying the approximation equation (19) produces the constants $$K_c = \cos\phi_1 \prod_{i=2}^{\gamma} \cos \omega_i$$

and $$K_s = \sin\phi_1 \prod_{i=2}^{\gamma} \cos \omega_i$$

while preserving adequate precision.

$$\frac{K_s}{\sin\phi_1} = \frac{K_c}{\cos\phi_1} \approx \prod_{i=2}^{\gamma} \cos 2^{-i} \quad (19)$$

$$\gamma \geq \left\lceil \frac{B-1}{2} \right\rceil \quad (20)$$

Similar to the Modified-CORDIC DDFS algorithm, a ROM provides sine and cosine values for the various algebraic sums of the first $\beta$ subangles $\pm\omega_k$ that are not sufficiently small to employ the approximation $\tan \omega_k \approx \omega_k$. The angles become successively smaller for each successive stage and the remaining angles after these first $\beta$ angles satisfy the approximation $\tan \omega_k \approx \omega_k$ to a desired accuracy. The sine and cosine values provided by the multiplexer are then input to the subsequent rotation stages, which perform the above rotations to calculate the sine and cosine values for the desired angle. Rather than using a multiplexer, a small ROM table can also be used to perform the same function.

The introduced angle decomposition in equation (21)

$$\omega = \phi_1 + \sum_{i=2}^{\gamma} r_i \omega_i + \sum_{i=\gamma}^{N} b_i \omega_i, \quad (21)$$

therefore, gives rise to equation (22)

$$\begin{bmatrix} \cos\omega \\ \sin\omega \end{bmatrix} = \begin{bmatrix} 1 & -b_N 2^{-N} \\ b_N 2^{-N} & 1 \end{bmatrix} \cdots \begin{bmatrix} 1 & -b_\gamma 2^{-\gamma} \\ b_\gamma 2^{-\gamma} & 1 \end{bmatrix} \times \begin{bmatrix} 1 & -r_\gamma 2^{-\gamma} \\ r_\gamma 2^{-\gamma} & 1 \end{bmatrix}$$

$$\cdots \begin{bmatrix} 1 & -r_{\beta+1} 2^{-(\beta+1)} \\ r_{\beta+1} 2^{-(\beta+1)} & 1 \end{bmatrix} \times$$

$$\begin{bmatrix} 1 & -r_\beta \tan 2^{-\beta} \\ r_\beta \tan 2^{-\beta} & 1 \end{bmatrix} \cdots \begin{bmatrix} 1 & -r_2 \tan 2^{-2} \\ r_2 \tan 2^{-2} & 1 \end{bmatrix} \begin{bmatrix} K_c \\ K_s \end{bmatrix} \quad (22)$$

which can be interpreted as follows.

The constants $$K_c = \cos\phi_1 \prod_{i=2}^{\gamma} \cos \omega_i$$

and $$K_s = \sin\phi_1 \prod_{i=2}^{\gamma} \cos \omega_i$$

provide appropriate scaling $$\prod_{i=2}^{\gamma}$$

$\cos \omega_i$ and rotation of the initial vector $(1,0)$ by an angle $\phi_1$. This angle $\phi_1$ corresponds to the sum of all half-angle values associated with the first $\gamma-1$ rotation stages. Each of the first $\gamma-1$ rotation stages either rotates positive (counter-clockwise) by the remaining half-angle amount to complete the full angle rotation or rotates negative (clockwise) by the already rotated half-angle amount to "derotate" the initial rotation and provide an overall rotation of zero. Since $\phi_1$ provides the half-angle rotations for only the initial $\gamma-1$ stages, the following rotation stages, such as minority select butterfly stages 32, either rotate by the full angle amount or perform no rotations.

In the Modified CORDIC approach, regardless of the overall rotation angle amount $\omega$, the rotation stages always perform rotations (either positive or negative).

Unlike in the Modified CORDIC approach, with the angle decomposition equation (21) providing an initial rotation $\phi_1$, the final stages may perform a positive rotation or no rotation. In the case of no rotation the butterfly stage collapses to a trivial pass-through. For example, in a DDFS implementation where the final five rotation stages correspond to $i \geq \gamma$, then depending on $\omega$, either all of these five stages, some of the five stages, or none of the stages may need to perform rotations. Most frequently there will be a stage that need not perform a rotation and it may be collapsed to a pass through. Unfortunately, none of these final five stages can be eliminated to reduce the overall hardware since all of them will be required to perform nonzero rotations for some $\omega$ (i.e., when $b_\gamma b_{\gamma+1}, \ldots b_{N-1} b_N = '11 \ldots 11'$.) Stages corresponding to $i \geq \gamma$ will be referred to as the final rotation stages.

The minority-select approach makes the elimination of at least half the total number of final rotation stages always possible by the following observation. The angle decomposition in equation (21) allows "no rotation" for each final rotation stage corresponding to a bit $b_i=0$. On the other hand, when $b_i=1$ the rotation stage performs the full rotation by the angle $\omega_i=2^{-i}$. One may modify the initial angle $\phi_1$ to include the sum of all full angle amounts corresponding to the final rotation stages. This modified initial angle will be denoted as $\phi_0$ to distinguish it from $\phi_1$. With $$\phi_0 = \sum_{i=2}^{\gamma} \omega_i + \sum_{i=\gamma}^{N} \omega_i$$

as the initial rotation angle, when $b_i=1$ the rotation has already been done with $\phi_0$ and the corresponding final rotation stage need not perform any rotation. In case $b_i=0$ the corresponding final rotation stage needs to perform a negative (clockwise) rotation by the full angle amount to cancel out that initial rotation component introduced by $\phi_0$. Therefore, there may be values of $\omega$ that require all final rotation stages to perform nonzero rotations (i.e., when $b_\gamma b_{\gamma+1}, \ldots b_{N-1} b_N =$ '00 ... 00'.)

The angle decomposition with $\phi_0$ is $$\omega = \phi_0 + \sum_{i=2}^{\gamma} r_i \omega_i - \sum_{i=\gamma}^{N} \overline{b}_i \omega_i \quad (23)$$

with $\omega_i=2^{-i}$, $r_i \in \{-1,+1\}$, and $\overline{b}_i \in \{0,+1\}$. The $\phi_0$, $r_i$ and $\overline{b}_i$ in equation (23) are $$\phi_0 = \sum_{i=2}^{\gamma} \omega_i + \sum_{i=\gamma}^{N} \omega_i = \frac{1}{2} - \frac{1}{2^N} + \frac{1}{2^\gamma} \quad (24)$$

$$r_i = \begin{cases} -1 & \text{if } b_{i-1} = 0 \\ +1 & \text{if } b_{i-1} = 1 \end{cases} \quad (25)$$

$$\overline{b}_i = \begin{cases} 1 & \text{if } b_i = 0 \\ 0 & \text{if } b_i = 1. \end{cases} \quad (26)$$

A derivation similar to the one that leads from equations (21) to (22) will produce $$\begin{bmatrix} \cos\omega \\ \sin\omega \end{bmatrix} = \begin{bmatrix} 1 & \overline{b}_N 2^{-N} \\ -\overline{b}_N 2^{-N} & 1 \end{bmatrix} \quad (27)$$

$$\ldots \begin{bmatrix} 1 & \overline{b}_\gamma 2^{-\gamma} \\ -\overline{b}_\gamma 2^{-\gamma} & 1 \end{bmatrix} \times \begin{bmatrix} 1 & -r_\gamma 2^{-\gamma} \\ r_\gamma 2^{-\gamma} & 1 \end{bmatrix}$$

$$\ldots \begin{bmatrix} 1 & -r_{\beta+1} 2^{-(\beta+1)} \\ r_{\beta+1} 2^{-(\beta+1)} & 1 \end{bmatrix} \times \begin{bmatrix} 1 & -r_\beta \tan 2^{-\beta} \\ r_\beta \tan 2^{-\beta} & 1 \end{bmatrix}$$

$$\ldots \begin{bmatrix} 1 & -r_2 \tan 2^{-2} \\ r_2 \tan 2^{-2} & 1 \end{bmatrix} \begin{bmatrix} K_c \\ K_s \end{bmatrix}$$

from equation (23) where $$K_c = \cos\phi_0 \prod_{i=2}^{\gamma} \cos\omega_i$$

and $$K_s = \sin\phi_0 \prod_{i=2}^{\gamma} \cos\omega_i.$$

The critical observation that leads to the elimination of at least half of the final rotation stages is that, given a sequence of $b_i$ corresponding to the final rotation stages for any $\omega$, the number of $b_i=1$ and $b_i=0$ are either equal to one another, or there are more ones than zeros, or there are more zeros than ones. Therefore, if there are more ones than zeros (i.e., if the minority bit is a '0'), then the initial angle can be made $\phi_0$ and more than half of the final rotation stages will always perform "no rotations" since more than half of the $b_i$ are '1'. If there are more zeros than ones (i.e., if the minority bit is a '1'), then the initial angle can be made $\phi_1$ and, again, more than half of the final rotation stages will always perform "no rotations" since more than half of the $b_i$ are '0'. In the event that the number of zeros and ones are equal, which is only possible if there is an even number of final rotation stages (i.e., if N–$\gamma$ is odd), then the initial angle can be made $\phi_0$ or $\phi_1$ and exactly half of the final rotation stages will always perform "no rotations". Therefore, by making the initial rotation angle $\phi$ depend on the minority bit, half or more than half of the final rotation stages can be completely eliminated.

In operation, minority-bit detector 34 receives the $b_\gamma b_{\gamma+1} \ldots b_{N-1} b_N$ least-significant portion of the angle at the output of the phase multiplier stage 40, and generates a minority bit signal depending on whether the minority of the $b_\gamma b_{\gamma+1} \ldots b_{N-1} b_N$ bits are '1' or '0' bits. The minority-bit detector 34 also generates shift and zero signals for the minority-select stages from the input $b_\gamma b_{\gamma+1} \ldots b_{N-1} b_N$ bits.

The ability to perform a variable shift instead of a fixed shift operation in the final rotation stages may be necessary to facilitate the elimination of at least half of the rotation stages. For example, if there is a total of N=13 rotation stages and $\gamma=7$, then the final seven rotation stages corresponding to bits $\{b_7, b_8, b_9, b_{10}, b_{11}, b_{12}, b_{13}\}$ of $\omega$ can be reduced to only three rotation stages by appropriately choosing the initial angle $\phi_0$ or $\phi_1$ depending on the Minority-bit corresponding to the set $\{b_7, b_8, b_9, b_{10}, b_{11}, b_{12}, b_{13}\}$ at hand With the Minority-bit selection one will, in this case, require at most three rotations, but in general $$\left\lfloor \frac{N - \gamma + 1}{2} \right\rfloor$$

rotations will be required. In the conventional CORDIC and Modified CORDIC butterfly stages, the amount of rotation is fixed (i.e., the off-diagonal elements in the 2×2 matrices of equations (22) and (27) are fixed shifts to implement a multiplication by $2^{-i}$.) With the Minority-bit selection one knows the maximum number of possible rotations but that does not specify the rotation amounts. For the above discussed example, if there are two $b_i=1$ and five $b_i=0$ in the set $\{b_7, b_8, b_9, b_{10}, b_{11}, b_{12}, b_{13}\}$, then the minority bit is a '1' and, with an initial angle of $\phi_1$, only two rotations are necessary. One of the three rotation stages will need to perform no rotation. The other two stages will perform non-zero rotations but these rotation amounts depend on the specific indices i for which the two $b_i=1$. To accommodate this, the final $$\left\lfloor \frac{N-\gamma+1}{2} \right\rfloor$$

butterfly stages may employ an ability to perform a variable shift to appropriately control the rotation amount. Furthermore, they also need the ability to zero-out the multiplication terms to collapse into a pass-through for the no-rotation cases.

The selection of the initial rotation angle $\phi_0$ or $\phi_1$ can be done by constructing two lookup tables, such as minority 0 ROM 46 and minority 1 ROM 48 in rotation ROM stages 42 for the initial β–1 rotation stages. Minority 0 ROM 46 has contents corresponding to $\phi_0$ and minority 1 ROM 48 has contents corresponding to $\phi_1$. The Minority bit from minority-bit detector 34 may then be used to select the appropriate lookup table output from ROMs 46 or 48. Usually a lookup table such as ROM 46 or 48 is small in size and the area penalty for duplicating it is smaller than the area savings gained from the complete elimination of at least half of the final rotation stages. Furthermore, since, depending on the Minority bit, only one of the lookup tables is utilized at a particular time, the Minority bit itself can also be used to disable the toggling of the unused lookup table address bits to further decrease power consumption.

The desirable DDFS performance specification (i.e., DDFS output accuracy) is determined by a variety of DDFS design parameters such as, for example, the number of DDFS output bits. The required accuracy of approximation (19), which dictates a certain achievable DDFS performance level, is captured by B in inequality (20). The appropriate choice of B, in turn, impacts the minimum value of DDFS design parameter γ via the inequality (20). The practical implications of the value of γ is the boundary point between the rotational butterfly stages 30 and the minority select butterfly stages 32. Similarly, the choice of β for ROM 46 and ROM 48 dictates the boundary point between the ROM stages 42 and the rotational butterfly stages 30. Therefore, the choice of β=γ makes the boundary point between the ROM stages 42 and the rotational butterfly stages 30 and the boundary point between the rotational butterfly stages 30 and the minority select butterfly stages 32 become coincidental, hence, completely eliminating the existence of rotational butterfly stages 30. Given a desirable DDFS performance specification, the choice of β=γ may or may not be feasible, which means that the necessity for the absence or presence of rotational butterfly stages 30, respectively, is also dictated by the target DDFS performance specification.

The butterfly stages 30 may be implemented in accordance with the embodiments shown in U.S. Pat. No. 5,737,253 referenced above. For example, each butterfly stage may include a pair of multipliers and a pair of adder/subtractors. In operation, the multipliers determine the amount of rotation and the adder/subtractors determine the direction of the rotation. When the rotation is positive, the adder/subtractor producing the X output performs a subtraction operation and the adder/subtractor producing the Y output perform an addition operation. When the rotation is negative, on the other hand, the adder/subtractor producing the X output performs an addition operation while the adder/subtractor producing the Y output perform a subtraction operation.

Figure 3:
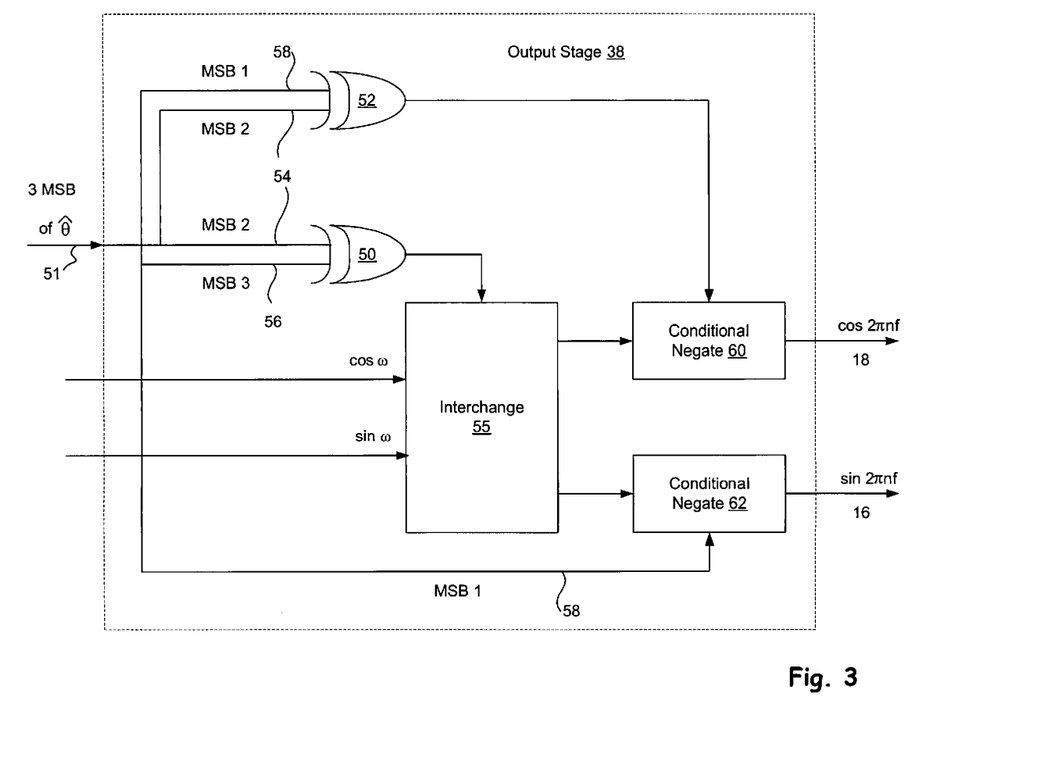
FIG. 3 is a block diagram illustration of output stage 38 shown in FIG. 1.

Referring now to FIG. 3, output stage 38 receives cos ω and/or sin ω from the output of the last minority-select butterfly stage 32 as well as the MSB bits 51 of the mapping function input angle 28, $\hat{\theta}$, from truncate stage 27 to produce outputs 18, cos 2π$\hat{\theta}$, and/or 16, sin 2π$\hat{\theta}$. In an embodiment using an octant configuration, output stage 38 performs the necessary conditional exchange and conditional negate operations at the output. The interchange and negate functions are a function of the top three MSB bits of the angle $\hat{\theta}$ (the octant information). The input cos ω and since are interchanged when the exclusive-OR function 50 on the second MSB 54 and 3rd MSB 56 is '1', otherwise the inputs are not interchanged. If the exclusive-OR functions on the first MSB 58 and second MSB 54 is '1', the cosine output 18 is generated by negating, in conditional negate 60, the corresponding output from the conditional interchange function 55. Alternatively, if the exclusive-OR function 52 on the first MSB 58 and second MSB 54 is '0', the cosine output 18 is simply the corresponding output from the conditional interchange function 55. The sine output 16 is produced from the corresponding output of the conditional interchange function 55 by performing a negation in conditional negation 62 only when the first MSB 58 is a '1'.

Figure 2:
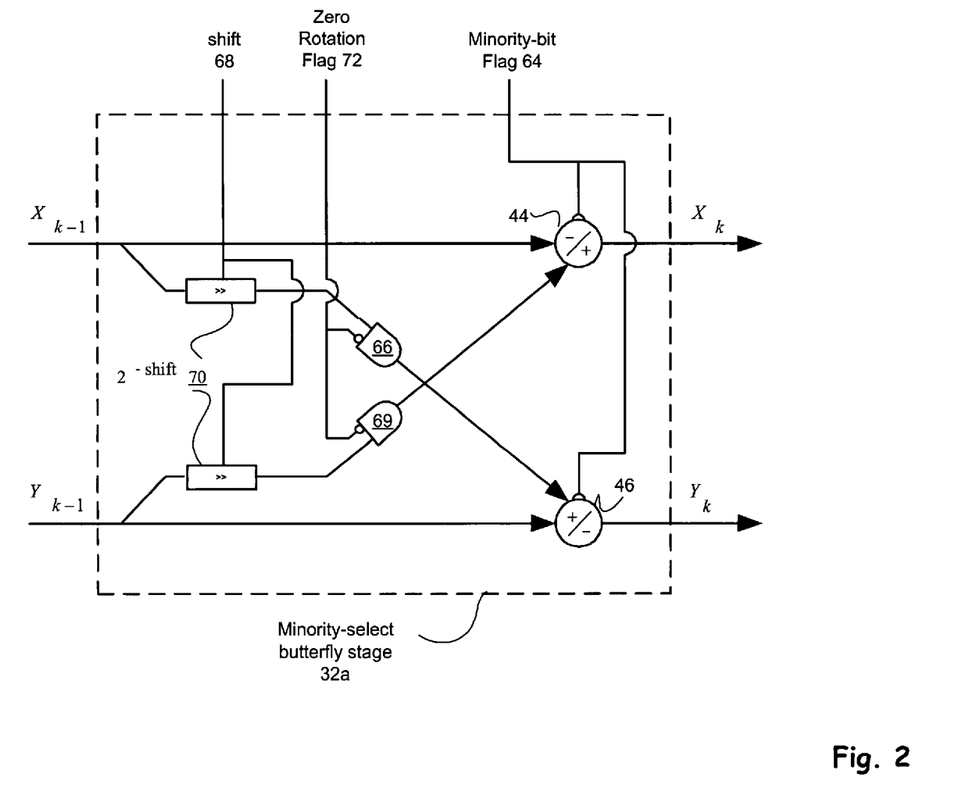
FIG. 2 is a block diagram illustration of one of the minority-select butterfly stages represented in FIG. 1.

Referring now to FIG. 2, the ability to perform positive or negative rotation, which is also a function of the Minority bit, can be simply controlled by adder/subtractors 44 and 46 in minority-select butterfly stage 32a, depicted in more detail. In operation, minority bit flag 64 is applied to adder/subtractors 44 and 46 to dictate the direction of rotation. A positive rotation corresponds to a subtraction at adder/subtractor 44 and an addition at adder/subtractor 46 if the flag is set. A negative rotation corresponds to an addition at adder/subtractor 44 and a subtraction at adder/subtractor 46 if the flag is not set. Shift value 68 is applied to shifters 70, the outputs of which are applied to non-inverted inputs of AND gates 66 and 69. The inverted inputs to AND gates 66 and 69 are provided by Zero Rotation Flag 72 which, if set, effectively passes the input signals through Minority-select butterfly stage 32a without rotation.

The invention claimed is:

1. A direct digital frequency synthesizer circuit, comprising:
   a phase accumulator responsive to a frequency control input to produce a sequence of normalized rotation angles; and
   a mapping function circuit responsive to the phase accumulator circuit for producing one or more digital output signals including a sequence of values representing sine and/or cosine functions of the sequence of rotation angles related to the frequency control input, the mapping function circuit comprising:
   a phase mapper and phase multiplier circuit responsive to the sequence of normalized rotation angles for producing a series of subangles in a fixed angular range;
   a minority-bit detector circuit responsive to the series of subangles to generate a minority-bit signal based on whether positive rotation operations or no-rotation operations are in the minority in a subset of the series of subangles; and
   at least one minority-select rotation circuit stage for performing a positive, negative, or zero rotation on the subset of the series of subangles in response to the minority-bit detector circuit.

2. The invention of claim 1, wherein the mapping function circuit further comprises an initial rotation angle stage for converting a second subset of the series of subangles into an initial rotation operation determined by the minority-bit signal.

3. The invention of claim 2 wherein the initial rotation angle stage further comprises:

a first lookup table with entries corresponding to the minority-bit signal indicating that positive rotation operations are in the minority of the operations to be performed by the at least one minority-select rotation circuit stage.

4. The invention of claim 2 wherein the initial rotation angle stage further comprises:
a first lookup table with entries corresponding to the minority-bit signal indicating that no-rotation operations are in the minority of the operations to be performed by the at least one minority-select rotation circuit stage.

5. The invention of claim 2 wherein the initial rotation angle stage further comprises:
a first lookup table with entries corresponding to the minority-bit signal indicating that positive rotation operations are in the minority of the operations to be performed by the at least one minority-select rotation circuit stage; and
a second lookup table with entries corresponding to the minority-bit signal indicating that no-rotation operations are in the minority of the operations to be performed by the at least one minority-select rotation circuit stage.

6. The invention of claim 1. wherein the number of minority-select rotation circuit stages is equal to a rounded down whole number of half the number of subangles contained in the subset of the series of subangles.

7. The invention of claim 1, wherein the at least one minority-select rotation circuit stage performs either positive rotation operations or no rotation operations if the minority-bit detector circuit determines that positive rotation operations are in the minority in the subset of the series of subangles.

8. The invention of claim 1, wherein the at least one minority-select rotation circuit stage performs only negative rotation operations or no rotation operations if the minority-bit detector circuit determines that no rotation operations are in the minority in the subset of the series of subangles.

9. The invention of claim 1, wherein the at least one minority-select rotation circuit stage performs:
positive rotation operations only if the minority-bit detector circuit determines that positive rotation operations are in the minority in the subset of the series of subangles;
negative rotation operations only if the minority-bit detector circuit determines that no rotation operations are in the minority in the subset of the series of subangles.

10. The invention of claim 1 wherein any of the at least one minority-select rotation circuit stages determined by the minority-bit detector circuit to not be required to perform rotation operations are caused to not perform rotation operations.

11. The invention of claim 1 wherein the mapping function circuit further comprises at least one rotational butterfly stage in addition to the at least one minority-select rotation circuit stage.

12. The invention of claim 1 wherein the at least one minority-select rotation circuit further comprises:

a shift circuit for shifting inputs by an amount indicated by the minority-bit detector circuit; and
a zero rotation circuit for causing inputs not to be rotated.

13. The invention of claim 1 wherein the mapping function circuit includes at least one lookup table preceding the at least one minority-select rotation circuit stage.

14. The invention of claim 1 wherein the mapping function circuit further comprises:
an additional set of circuit stages for transforming subangles by rotation.

15. The invention of claim 1 wherein the series of subangles in a fixed angular range are in one quadrant or octant.

16. A method for a direct digital frequency synthesizer of performing direct digital frequency synthesis, comprising the following steps:
producing by said direct digital frequency synthesizer a sequence of normalized rotation angles in accordance with a frequency control input;
producing by said direct digital frequency synthesizer a series of subangles from the sequence of normalized rotation angles;
determining with respect to a subset of the series of subangles, a minority-bit signal based on whether positive rotation operations or no-rotation operations are in the minority in the subset of the series of subangles; and
performing by said direct digital frequency synthesizer a series of transformation operations responsive to the series of subangles to produce one or more digital output signals including a sequence of values representing sine and/or cosine functions of the sequence of normalized rotation angles related to the frequency control input, a subset of transformation operations corresponding to the subset of the series of subangles, being performed as positive, negative or no-rotation operations in accordance with the minority-bit signal the total number of transformation operations required is reduced.

17. The invention of claim 16 wherein a series of rotational stages is used to perform the transformation operations for the subset of transformations, the method further comprising:
determining with respect to each subangle of the subset of the series of subangles if no-rotation operations are to be performed in some of the corresponding rotational stages used to perform the transformation operations in the subset.

18. The invention of claim 17 wherein any rotational stages determined to not require rotation operations are caused to not perform rotation operations.

19. The invention of claim 16 wherein an initial subset of the transformation operations are performed by lookup in a table.

20. The invention of claim 19 wherein the entries in the table correspond to the type of rotation operations determined to be in the minority in the subset of the series of subangles.

* * * * *